United States Patent [19]

Nesson et al.

[11] 3,922,690
[45] Nov. 25, 1975

[54] CAMERA CONSTRUCTION

[75] Inventors: Israel Nesson, Fair Lawn; Thomas G. Graham, Point Pleasant Beach, both of N.J.

[73] Assignee: Berkey Photo, Inc., Paramus, N.J.

[22] Filed: Sept. 25, 1974

[21] Appl. No.: 509,045

[52] U.S. Cl. ............... 354/49; 354/59; 354/270
[51] Int. Cl.² .......................................... G03B 7/18
[58] Field of Search .......... 354/42, 48, 49, 59, 271, 354/270

[56] References Cited
UNITED STATES PATENTS

| | | | |
|---|---|---|---|
| 3,044,375 | 7/1962 | Schäfer | 354/42 |
| 3,111,888 | 11/1963 | Ohashi et al. | 354/49 |
| 3,191,511 | 6/1965 | Burgarella et al. | 354/49 |
| 3,307,460 | 3/1967 | Land | 354/42 |
| 3,418,903 | 12/1968 | Land et al. | 354/42 |
| 3,539,252 | 11/1970 | Gleason | 354/271 X |

*Primary Examiner*—Joseph F. Peters, Jr.
*Assistant Examiner*—James LaBarre

[57] ABSTRACT

A camera construction has been provided which incorporates means for varying the time interval between the release of a lens-opening shutter means and the release of a lens-closing shutter means. The time interval varying means includes a photoelectric cell which is operatively connected to the means for releasing the lens-closing shutter means. Manually controlled means is provided for varying the intensity of the light which is directed towards the photoelectric cell.

4 Claims, 8 Drawing Figures

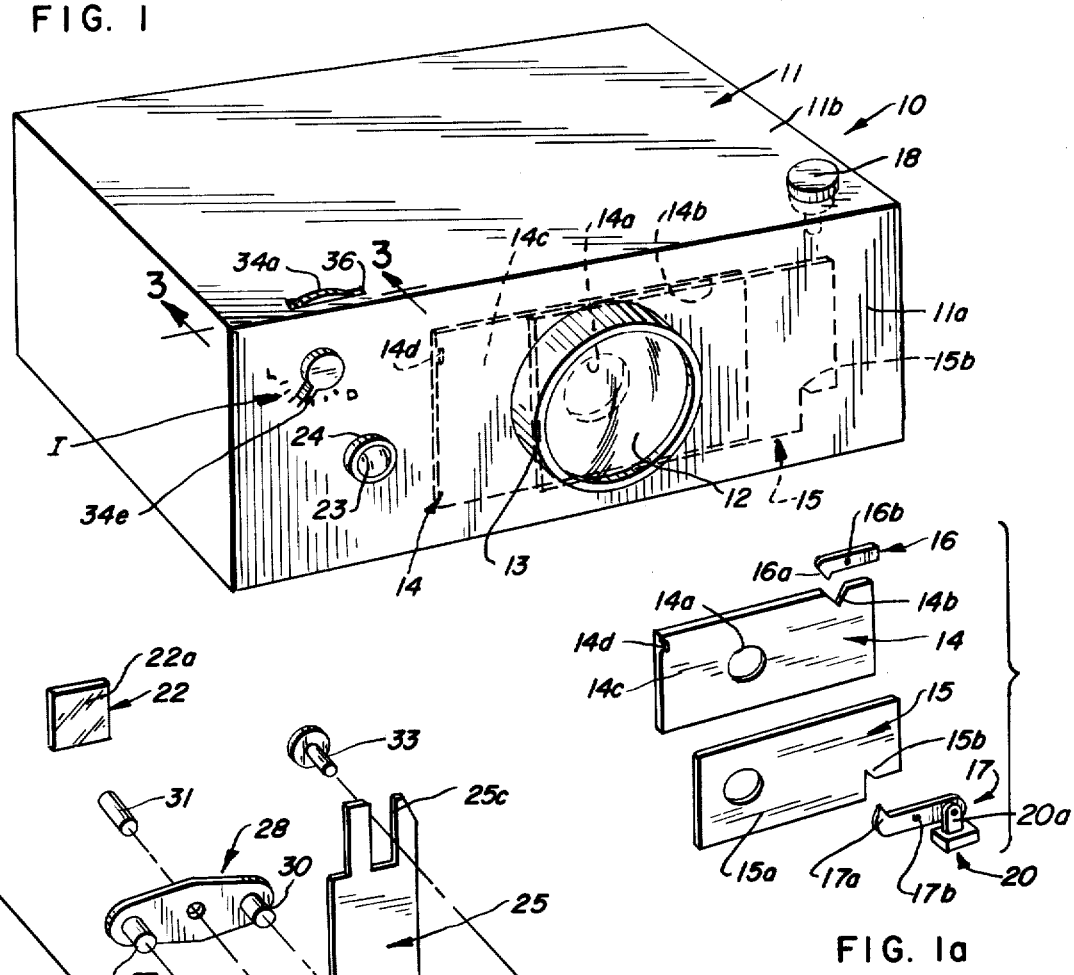
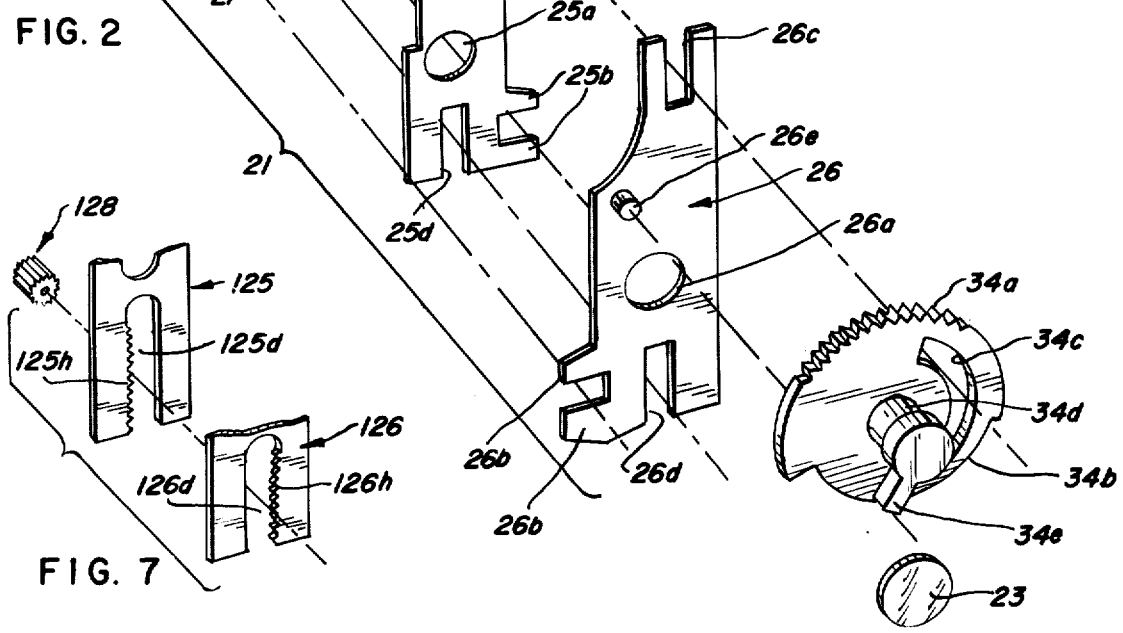

CAMERA CONSTRUCTION

BACKGROUND OF THE INVENTION

Various cameras have heretofore been provided which incorporate light-intensity control means; however, because of certain design characteristics they have been beset by one or more of the following shortcomings: (a) the control means was awkward and difficult to manipulate; (b) the control means was not built into the camera housing; (c) the control means was of a bulky and complex construction; and (d) the control means was highly susceptible to malfunctioning.

SUMMARY OF THE INVENTION

Thus, it is an object of the invention to provide a camera which is not beset with any of the aforenoted short-comings.

It is a further object of the invention to provide a camera having a light-intensity control means wherein the latter is of simple, compact construction and does not interfere with the normal operation of the other components of the camera.

Further and additional objects will appear from the description, accompanying drawings and appended claims.

In accordance with one embodiment of the invention, a camera is provided which includes a housing having a main lens disposed in a front wall thereof, a lens-opening shutter means, and a lens-closing shutter means disposed adjacent said lens-opening shutter means and movable independently thereof. The shutter means are mounted within the housing. A first release is movably mounted within the housing and is adapted to normally retain the lens-opening shutter means in a cocked position wherein the shutter means is disposed in a lens-closing position. Upon manual manipulation of the release, the shutter means is released from its cocked position and automatically moves to an uncocked position wherein the shutter means is disposed in a lens-opening position. A second release is movably mounted within the housing adjacent the lens-opening shutter means and adapted when energized to normally retain the lens-closing shutter means in a cocked position wherein the latter shutter means assumes a lens-opening position. When the second release is de-energized, the lens-closing shutter means is released and automatically moves to an uncocked position. Both of the shutter means are biased to assume an uncocked position. The second release is energized by the first release upon initial manual manipulation thereof and prior to the lens-opening shutter means being released thereby to move from a cocked position to an uncocked position. A time delay means is provided within the housing which is adapted to vary the time interval between the release of the lens-opening shutter means and the lens-closing shutter means. The time interval-varying means includes a photoelectric cell disposed within the housing and aligned with an opening formed in the housing front wall. Positioned between the photoelectric cell and the housing opening are a pair of apertured shield members having corresponding apertures thereof disposed in overlapping relation. The shield members are mounted for simultaneous relative movement in opposite directions whereby the amount of overlap of the corresponding apertures may be varied. The overlapping portions of the corresponding apertures are aligned with the front wall opening of the housing. A manual control is mounted on the housing for moving the shield members to predetermined relative positions of adjustment whereby the intensity of light directed to the cell is regulated.

DESCRIPTION

For a more complete understanding of the invention, reference should be made to the drawings wherein FIG. 1 is a fragmentary perspective view of one form of the improved camera, and showing in dotted lines the lens-opening shutter means in an uncocked position and the lens-closing shutter means in a cocked position.

FIG. 1a is an exploded perspective view of the shutter means and associated components therefor.

FIG. 2 is an exploded perspective view of one form of the time-interval varying means embodied in the camera shown in FIG. 1.

FIG. 7 is an exploded fragmentary, perspective view of a second form of the time-interval varying means.

Figure 4:
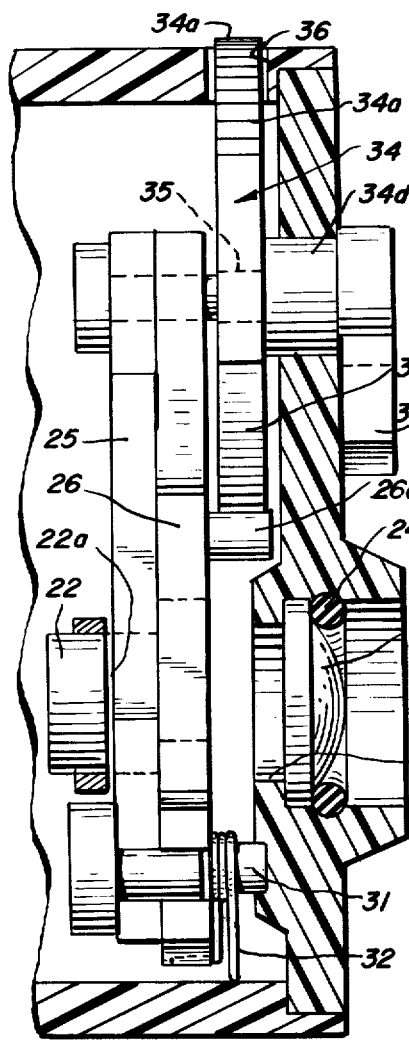
FIG. 4 is a fragmentary sectional view taken along line 4—4 of FIG. 3.

Referring now to the drawings and more particularly to FIG. 1, one form of an improved camera 10 is shown which includes a housing 11 for accommodating the film to be exposed. The front wall 11a of the housing has mounted thereon a main lens 12 which is encompassed by a suitable focusing ring 13. Slidably mounted within the housing 11 and disposed behind the front wall 11a are first and second shutter means 14 and 15 of conventional configuration. The first shutter means 14 is normally referred to as the lens-opening shutter means and the second shutter means is normally referred to as the lens-closing shutter means. Shutter means 14, in the illlustrated embodiment, comprises a thin, plate-like opaque member of substantially rectangular configuration. The member 14 is provided with an aperture 14a which is adapted to be aligned with the optical axis of the lens 12, when the shutter member 14 assumes its uncocked lens-opening position as shown in FIG. 1. The upper peripheral edge of the member 14, adjacent the right-hand side thereof, is provided with a notch 14b which is adapted to automatically accommodate an end 16a of a release lever 16 when the shutter member 14 assumes a cocked position. When member 14 is in its cocked position, the imperforate left-hand portion 14c thereof is aligned with the lens axis, thereby preventing exposure of the accommodated film by the light rays passing through the main lens 12.

The shutter means 15, in the illustrated embodiment, also comprises a thin, plate-like opaque member which is of substantially rectangular configuration; however, an opening 15a is formed in the left-hand end, see FIG. 1a. The hole 15a is placed such that member 15 will not obstruct opening 14a when member 14 is in an uncocked position and member 15 is in a cocked position. The lower peripheral edge of member 15 adjacent the right-hand side thereof is provided with a notch 15b which is adapted to automatically accommodate an end 17a of a release lever 17 when the member 15 assumes a cocked position. The left-hand edge of member 14 is provided with a projection 14d which is adapted to engage the left-hand edge of member 15 when both members are in an uncocked position. The projection 14d enables the members 14 and 15 to be simultaneously moved to their respective cocked positions when the shutter member 14 is automatically rococked in a manner well understood in the art.

The shutter members 14 and 15 in the illustrated embodiment are arranged in face-to-face relation and are mounted to slidably move along linear paths independently of one another towards their uncocked positions in a manner well known in the art.

The release lever 16 is moved to a release position by means of a linkage arrangement, not shown, upon a trigger button 18 being manually depressed. Button 18 is adjustably mounted on the upper surface 11b of the housing 11. The button is adapted to normally assume a non-depressed position.

Release lever 16 is biased in a counter-clockwise direction about pivot point 16b as an axis by a suitable spring, not shown.

Release lever 17 is pivoted about axis 17b to a shutter member retaining position upon the armature 20a of a solenoid 20 becoming energized. The armature 20a is pivotally connected to the lever 17 as seen in FIG. 1a. The solenoid 20 and release lever 17 are mounted within the housing 11. Depressing of release button 18 automatically energizes solenoid 20 prior to shutter members 14 being released by lever 16. De-energizing of solenoid 20 is controlled by a time-interval varying means 21 which is shown in part in an exploded view, FIG. 2.

Means 21 includes a photoelectric cell 22 which is fixedly mounted within the housing 11 and is disposed in aligned relation with an opening 11c, see FIG. 4, formed in the front wall 11a of the housing. The cell 22 is electrically connected to the solenoid 20 in a manner known in the art. Power for the solenoid is obtained from a suitable battery, not shown, disposed within the housing. The opening 11c is laterally spaced from the main lens 12. Disposed in overlying relation with respect to the opening 11c is an auxiliary lens 23 which is retained in position by a retainer ring 24.

Disposed intermediate the lens 23 and the light-sensitive surface 22a of the cell is a pair of relatively movable shield members 25 and 26. Each shield member is formed of opaque material and is provided with an aperture 25a or 26a and the apertures are adapted to overlap one another in varying amounts depending upon the relative position of the members. The shield members are thin and of plate-like configuration and are arranged in face-to-face relation for movement in parallel vertical planes. Depending upon the setting of the lever 34e, the shield members will assume a normal position wherein the apertures thereof are disposed in a predetermined overlapping relation. When the members are in said normal position the time-interval between the release of the shutter members is proportional to the ambient light received by the cell 22 for a given film exposure index.

Figure 5:
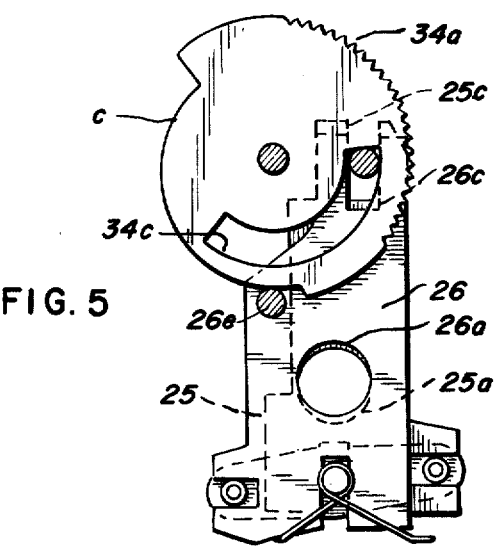
FIGS. 5 and 6 are fragmentary views similar to FIG. 3 but on a reduced scale and showing, respectively, the apertures of the shield members in substantially maximum and minimum overlap.
Figure 6:
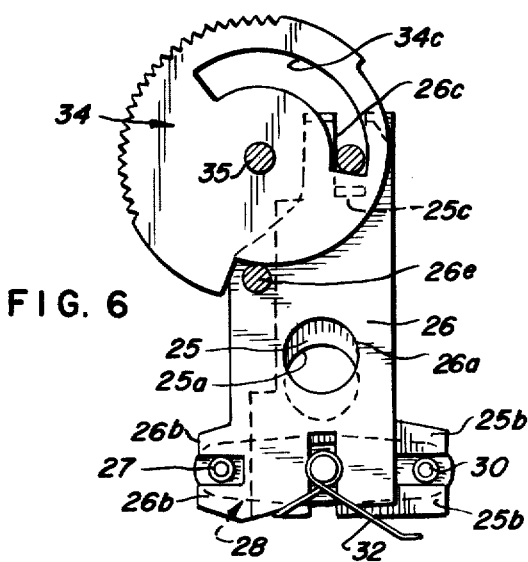

Each shield member, as seen in FIG. 2, is provided with a pair of fingers 25b or 26b which project laterally from the lower portion of the side edge thereof. The fingers 25b on member 25 extend in an opposite direction from fingers 26b of member 26, see FIGS. 3, 5 and 6. Extending transversely between fingers 26b is a pin 27 which protrudes from one end of a rocker arm 28. Protruding from the opposite end of the rocker arm is a second pin 30 which is adapted to extend transversely between the fingers 25b of member 25. Rocker arm 28 is mounted so as to pivot at its midlength about a fixed stud 31. Thus, by reason of the rocker arm 28 as shield member 25 moves either downwardly or upwardly, member 26 will move in the opposite direction. A spring 32 is provided which is adpated to exert an upward force on the underside of either member 25 or 26.

The upper edge of each shield member is provided with an open end slot 25c or 26c. Each slot is adapted to accommodate a common guide pin 33 which is fixedly mounted within the housing 11. The lower edge of each shield member is also provided with an open slot 25d or 26d which is adapted to accommodate the stud 31. The guide pin 33 and stud 31 serve to restrict movement of each shield member in a predetermined linear path within a given vertical plane.

Shield member 26 is provided with a transversely extending stud 26e, the function of which will be described more fully hereinafter.

Figure 3:
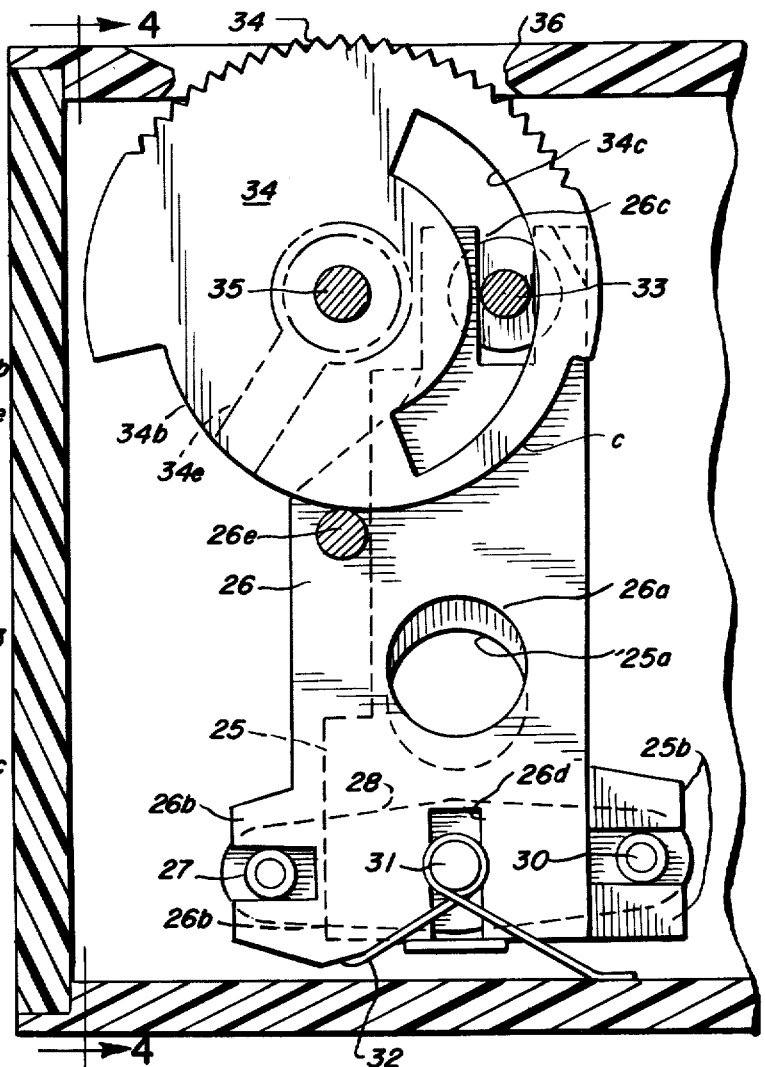
FIG. 3 is an enlarged fragmentary sectional view taken along line 3—3 of FIG. 1.

Vertical movement of shield members 25 and 26 is effected through a disc-shaped control element 34 which is mounted on the housing 11 for rotation about a pin 35, see FIG. 3, disposed substantially parallel to the optical axis of the auxiliary lens 23. The upper peripheral segment 34a of element 34 is knurled or otherwise roughened and has a portion thereof protruding through a slot 36 formed in the upper surface 11b of the housing, see FIGS. 1 and 3. The lower peripheral segment 34b is shaped to form a curved cam surface C which is in continuous contact with the stud 26e carried by shield member 26. As the control element 34 is manually rotated in a clockwise direction, the cam surface C will exert a downward force on stud 26e, thereby causing the apertures 26a and 25a to assume a maximum overlapping relation, see FIG. 5, whereby the cell 22 will be exposed to maximum light intensity. Thus, when such a condition exists, the time delay between the release of shutter means 14 and the release of shutter means 15 will be shorter than normal, thereby effecting a shorter than normal exposure of the accommodated film to the light rays passing through the main lens 12.

On the other hand, when the element 34 is manually rotated in a counterclockwise direction to its fullest extent, aperture-overlap of the shield members is at a minimum, thus the resulting time-delay between the release of the shutter members will be longer than normal and a longer than normal exposure of the film will occur.

As seen in FIGS. 3, 4, 5 and 6, control element 34 is provided with an arcuate slot 34c through which extends guide pin 33. The center of curvature of slot 34c is coincident to the pin 35. Element 34 is provided with a bearing sleeve portion 34d which encompasses pin 35 and projects through a suitable opening formed in the front wall 11a of the housing. A pointer 34e is formed on the exposed end of sleeve portion 34d and cooperates with indicia I, provided on the housing front wall 11a and, thus, enables the user of the camera to readily observe the relative positions of the shield members.

FIG. 7 shows a pair of modified shield members 125 and 126 and a pinion gear 128 which has been substituted for the rocker arm 28. The gear 128 extends through slots 125d and 126d formed in the lower portion of the respective members. One elongated peripheral segment 125h or 126h of the respective slot 125d or 126d has gear teeth formed therein which are in meshing relation with the pinion gear 128. The peripheral segments 125h and 126h are in diametrically opposed relation with respect to the pinion gear 128. Thus, movement of member 125 in one direction imparts movement of member 126 in an opposite direction.

Thus, it should be noted that a camera has been provided which embodies manually adjustable means for differentially varying the otherwise automatically determined time interval between the shutter members so as to readily compensate for abnormal conditions of operation. The means is of simple construction, will not require enlargement of the physical dimension of the camera, and is easy to manipulate.

I claim:

1. A camera construction comprising a housing having a main lens; a first shutter means mounted on said housing for movement between a lens-blocking cocked position and a lens-unblocking uncocked position; a second shutter means adjacent said first shutter means and mounted on said housing for movement between a lens-unblocking cocked position and a lens-blocking uncocked position, both of said shutter means being biased to assume uncocked positions; a movable first release means mounted on said housing for normally retaining said first shutter means in a cocked position and adapted, when manipulated, to effect release of said first shutter means from said cocked position; a movable second release means mounted on said housing and adapted to be electrically energized and when energized retaining said second shutter means in a cocked position and when de-energized effecting release of said second shutter means from said cocked position, said second release means being energized by said first release means prior to the latter releasing said first shutter means; and time delay means within said housing and operatively connected to said second release means for varying the time interval between energizing and de-energizing of said second release means; said time delay means including a photoelectric cell spaced from said main lens and electrically connected to said second release means and adapted to receive a light beam from an external source through an opening in the housing, light intensity differential control means adjustably mounted within said housing for varying the intensity of the light received by said cell, said control means including a pair of apertured shield members arranged in face-to-face relation and disposed intermediate the photoelectric cell and the opening in the housing, each shield member having an aperture formed therein and in overlapping relation with the corresponding aperture of the other shield member, said shield members being interconnected for simultaneous movement in opposite directions to vary the amount of overlap of the corresponding apertures, the movement of one of said shield members being dependent upon the movement of the other shield member, the overlapped portions of said apertures being in continuous central alignment with the photoelectric cell, a manually adjustable means mounted on said housing for selectively effecting movement of one of said shield members to vary the amount of aperture overlap, said manually adjustable means being provided with a cam surface independent of the interconnection of said shield members, and spring means exerting a bias on at least one of said shield members whereby a portion of said one shield member is in continuous engagement with said cam surface.

2. The camera construction of claim 1 wherein the manually adjustable means is mounted for rotation about an axis in spaced parallel relation to the optical axis of the main lens, rotational manipulation of said means effecting rectilinear movement of said shield members in parallel planes disposed substantially transversely of the axis of said adjustable means.

3. The camera construction of claim 1 wherein portions of said shield members are engaged by a common rocker member mounted on said housing for movement about a fixed axis, said rocker member comprising a first protruberance disposed to one side of the pivotal axis and positioned within an elongated slot formed in one of the shield members, and a second protuberance disposed on the opposite side of said pivotal axis and positioned within an elongated slot formed in the other shield member, the longitudinal axes of said slots being in substantially parallel relation and disposed substantially transverse to the directions of movement of said shield members.

4. The camera construction of claim 3 wherein each shield member is provided with a second elongated slot having the longitudinal axis thereof substantially parallel to the direction of movement of said shield member, the second slots of said shield members slidably accommodating a common guide element fixedly mounted on said housing.

* * * * *